United States Patent [19]

Burwell et al.

[11] Patent Number: 5,056,972
[45] Date of Patent: Oct. 15, 1991

[54] DEBURRING DEVICE

[75] Inventors: George E. Burwell, Newark; Michael A. Nelson, Westerville, both of Ohio

[73] Assignee: Nelson Tool Corporation, Sunbury, Ohio

[21] Appl. No.: 578,479

[22] Filed: Sep. 7, 1990

[51] Int. Cl.⁵ .............................................. B23D 1/08
[52] U.S. Cl. .................................... 409/299; 407/114
[58] Field of Search ................ 409/299, 140; 407/114, 407/113, 16, 115, 116; 29/33 A, 33 D, 33 T

[56] References Cited

U.S. PATENT DOCUMENTS 4,138,925  2/1979  Schulte .
4,358,231  11/1982  Meier .................................. 409/299
4,710,078  12/1987  Altmeyer et al. ............. 407/113 X

FOREIGN PATENT DOCUMENTS 209712  11/1984  Japan ................................ 409/299

Primary Examiner—David L. Pirlot
Assistant Examiner—R. Schultz
Attorney, Agent, or Firm—Sidney W. Millard

[57] ABSTRACT

A device for deburring the inner longitudinal welding seam of longitudinally moving, seam welded conduits. The device includes an elongated frame with a trailing head on which there is mounted a cutting ring positioned to cut or deburr such seam. The cutting ring dimensions and position effects enhanced deburring. Superior spring structure and hydraulic means effect improved positioning of the device within the conduit. Also an improved dovetail connection between the head and the frame avoids breakdowns.

13 Claims, 4 Drawing Sheets

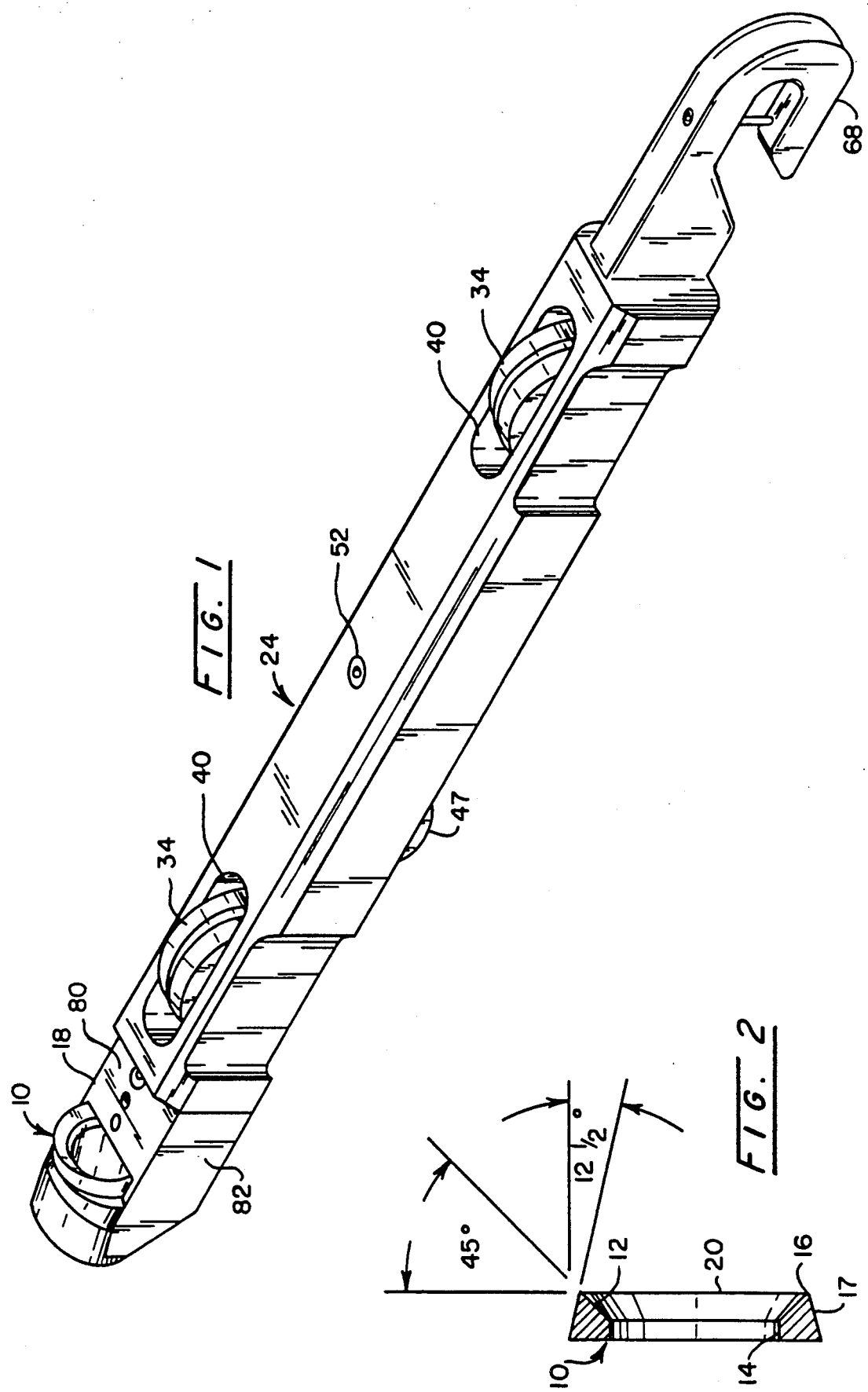

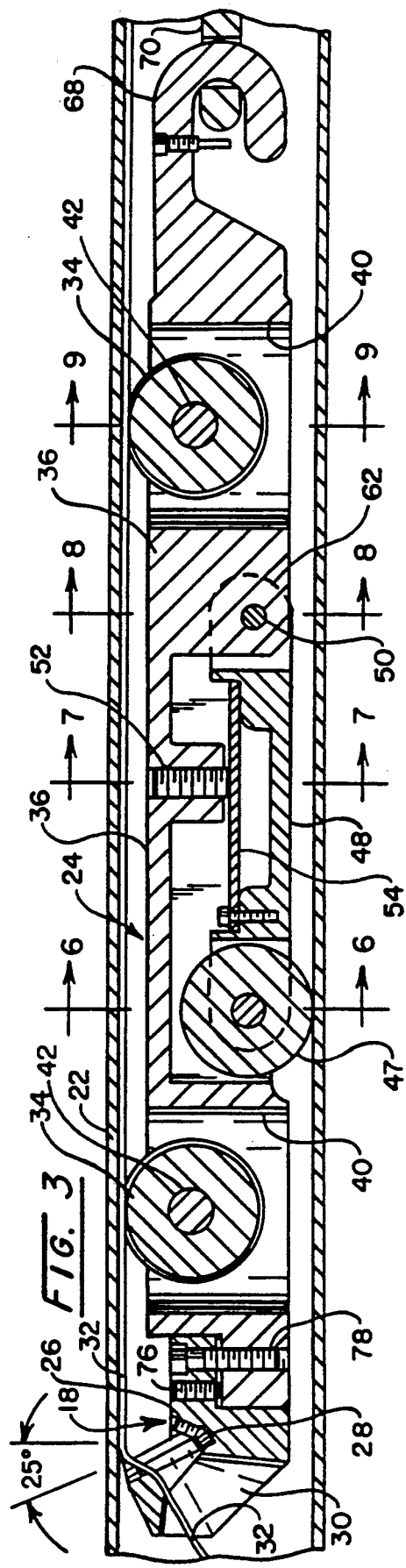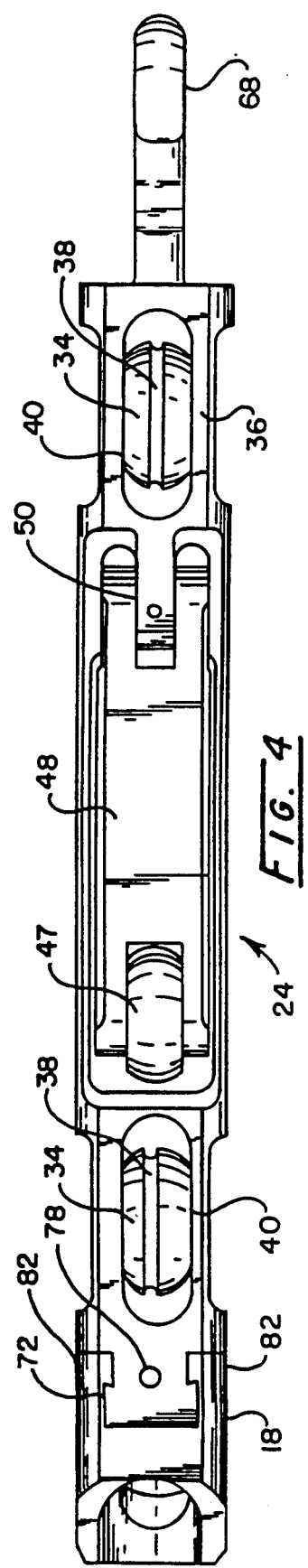

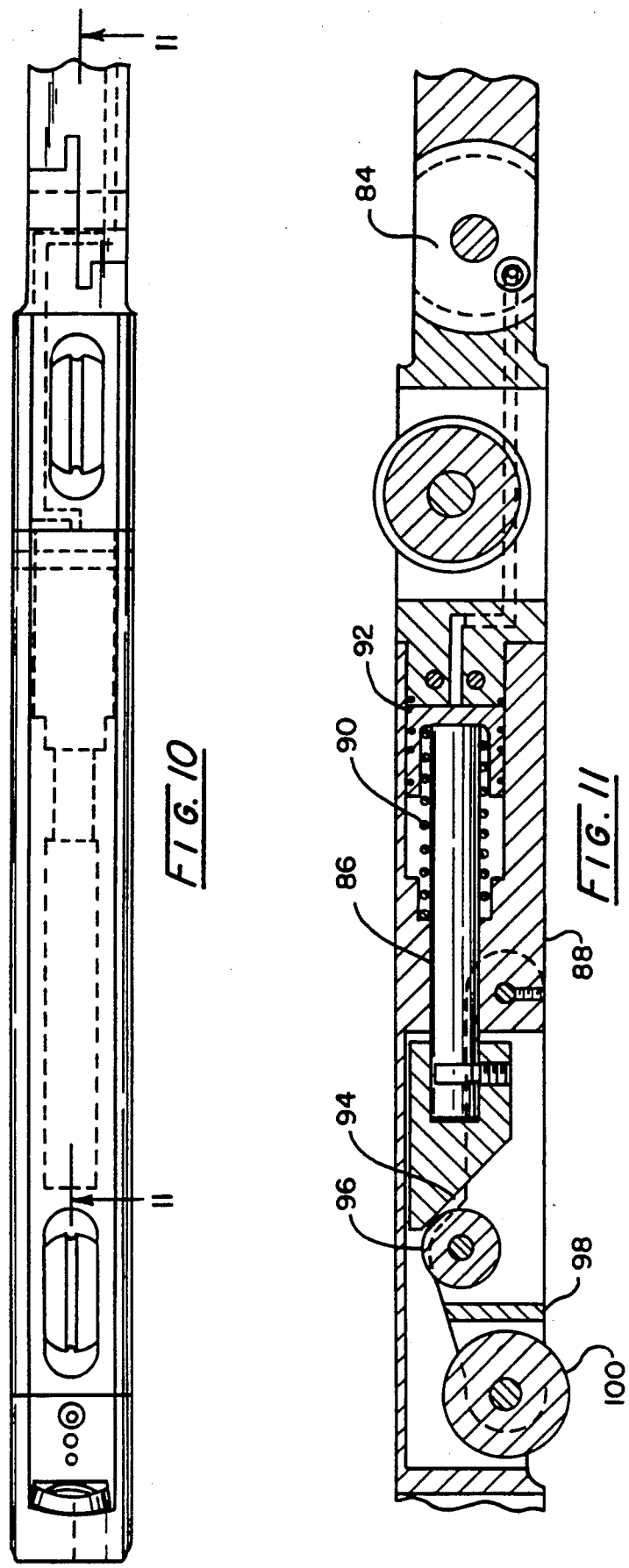

DEBURRING DEVICECL FIELD OF THE INVENTION

The present invention is directed to an improved device for internally deburring the internal weld or burr of a continuously welded conduit or tube.

BACKGROUND OF THE INVENTION

Conventionally a device for internal deburring of welded tubes is positioned within the tube and remains stationary as the conduit or tube is continuously formed and is propelled over the deburring device. A cutting or deburring blade or surface mounted on the device contacts and removes the tube weld or burr.

The cutting or deburring blade is typically a cutting ring angularly mounted on a trailing head portion of the deburring device to contact the inwardly projecting burr.

Prior known cutting rings such as those described in U.S. Pat. No. 4,710,078 are shaped and positioned in the head of a deburring device so that the cutting edge effects a cutting-scraping action to remove the burr. Such action effects a notch where the burr is removed that narrows the gauge of the metal and weakens the structure. The "notch effect" is caused primarily by the fact that the cutting ring is of lesser diameter than the tubing so that the arc of the cut is of lessor radius than the arc of the tube. As a result of the lessor radius of the ring, the cut encroaches on the gauge of the tube.

Additionally, the scraping action produces particles of metal and weld scale in quantities that do not clear the device through the ring and openings in the head effectively. Consequently the particles find their way into the moving and adjustable parts of the device and cause wear thereby reducing their effective time of operation.

Prior known devices that effectively cut the weld rather than the cutting-scraping action such as that shown by U.S. Pat. No. 4,138,925 also cause a notch effect and additionally are formed with a passage way through which the weld burr must pass that is too long to effectively allow such burr and particles to pass and clear the device and thus have proved to be ineffective.

Prior known devices such as those shown and described in U.S. Pat. Nos. 4,710,078 and 4,138,925 are subject to penetration of particles from the deburring operation into their mechanisms for positioning the cutting rings relative to the seam or weld. Such devices also are provided with guide and pressure wheels which ride on the inside surfaces of the tubes and space the devices for cutting. Spring mechanisms designed to maintain the positioning of such devices within the tubes must be adjusted outside of the tubes and typically fracture and fail when subject to contact with obstacles (dirt, weld, particles) typically found in such tubes during deburring.

SUMMARY OF THE INVENTION

The design of the cutting ring of the present invention and the positioning of the ring in a cutting ring head of a deburring device enables one to cleanly cut or deburr the welded area by a clean cutting action that produces substantially fewer particles. The cut burr and particles more readily pass through the ring and opening to effect substantially less damage to the deburring device. Further, through the proper use of the ring and its positioning there is little or no "notch effect" in the deburred tubing.

A mechanism for adjusting the transverse position of the cutting ring relative to the welded seam has been devised that is not subject to particle penetration. Also, a spring tension means is provided for maintaining the position of the deburring device inside the seam welded tube that is not subject to failure in the manner of the prior known devices.

Further, the present invention includes hydraulic means for maintaining the position of the deburring device inside the seam welded tube that may be adjusted externally of the tube and while deburring.

BRIEF DESCRIPTION OF THE DRAWINGS

FIG. 1 is a perspective view of the apparatus of the present invention;

FIG. 2 is a cross-sectional view of the cutting ring utilized in the device of FIG. 1;

FIG. 3 is a longitudinal-sectional view of the device of FIG. 1 shown as positioned within a welded conduit and functioning to scarf the inwardly projecting burr;

FIG. 4 is a bottom plan view of the apparatus of FIG. 1;

FIG. 10 is a top plan view of an embodiment of the invention that uses hydraulic means to bias and position the device within a conduit; and FIG. 11 is a cross-sectional view of the embodiment of FIG. 10 taken along the plane indicated by the lines 11—11 of FIG. 10.

DESCRIPTION OF THE PREFERRED EMBODIMENTS

Figure 5:
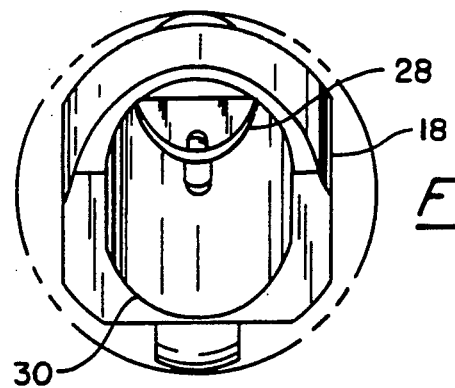
FIG. 5 is a left-hand side end view of the head of the device of FIG. 3.
Figure 6:
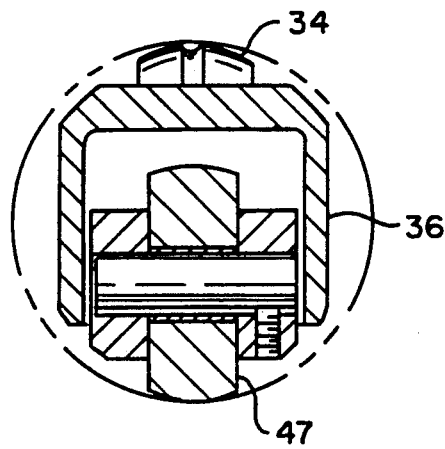
FIG. 6 is a cross-sectional view taken along the plane indicated by the lines 6—6 of FIG. 3.

Looking to FIG. 2, ring 10 is formed with a first frusto-conical inner surface 12 which culminates in an inner cylindrical surface 14. The outermost periphery 16 of the frusto-conical surface constitutes the cutting edge of the ring. The frusto-conical surface 12 tapers at about a 45° angle (± about 5°) from the face of the ring (or its axis) and its outer surface 17 tapers inwardly towards the direction of cutting at about $12\frac{1}{2}°$ (± about $2\frac{1}{2}°$) from a perpendicular to the face of the ring 10 (or the ring's axis). The latter dimension is critical to minimizing the effect of differences in the radius of the ring to the radius of the tube when the ring is positioned as described below.

Ring 10 is positioned in a ring holder or head 18 such as that shown by FIG. 3 so that the face 20 of the cutting ring is positioned at about a 25° (± about 5°) angle in respect to a perpendicular to the axis of the conduit being deburred 22 by the burr removing device 24. Preferably, to further minimize notch effect, cutting ring 10 should be of a diameter that is at least $\frac{1}{3}$ (preferably $\frac{1}{2}$) that of the inside diameter of the tube being scarffed. Preferably ring 10 is of less length than diameter.

Ring holder or head 18 is preferably formed with a seat 28 shaped to receive and seat the ring 10 so that it is firmly positioned at the desired 25°. A set screw 26 in an appropriately positioned threaded opening bears on and holds the ring 10 in position. However, if seat 28 is of proper dimensions, set screw 26 could be omitted. Passageway 30 opens from the inner cylindrical surface 14 of ring 10 to a greater diameter to help purge the burr 32 from conduit 22 in as complete a manner as possible as shown by FIG. 3.

The end view of FIG. 5 shows passageway 30 of head 18 through which the cut weld burr 32 and other debris passes into conduit 22.

The balance of the device is the preferred apparatus of the present invention although head or holder 18 can be readily adapted (i.e. retrofit) to other conventional deburring apparatus such as that shown in U.S. Pat. Nos. 4,710,078 and 4,138,925.

In the embodiments of FIGS. 3 and 4 the deburring device 24 is provided with rolls 34 that are rotatably mounted to the supporting frame 36 of device 24. Rolls 34 are formed with peripheral grooves 38 that are disposed to ride on or bridge over the weld burr 32 within the conduit 22 to prevent deflection of device 24 within conduit 22.

Figure 9:
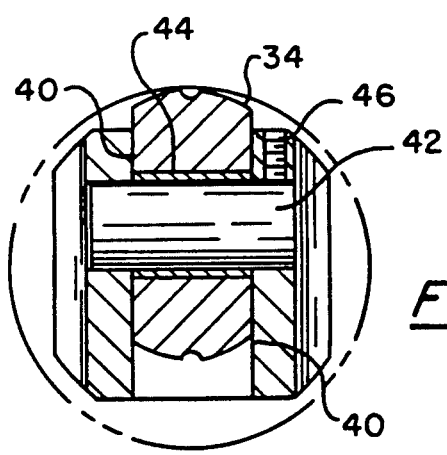
FIG. 9 is a cross-sectional view taken along the plane indicated by the lines 9—9 of FIG. 3.

As shown by FIGS. 3 and 9, rollers 34 are rotatably mounted in slots 40 of the frame 36 on roller pins 42 and bronze bushings 44. Pins 42 are rigidly fixed to frame 36 by set screw 46.

Rolls 34 are urged against the inner surface of conduit 22 by a roll 47 that is pivotally mounted in the frame 36 through lever arm 48 and pivotal connection 50. Roll 47 is urged against the inner wall of conduit 22 by a set screw 52 positioned in a threaded opening within frame 36 to bear on spanning spring members 54 attached to arm 48. By this arrangement the pressure on rolls 34 can be adjusted with set screw 52. This arrangement is used by prior known devices such as that described in U.S. Pat. No. 4,710,078. However, such springs in the prior known devices typically rupture when the rolls contact large obstructions within the tube such as debris from welding. It is found that by using Phosphor Bronz spring plates rather than the conventional spring steel the potential rupturing of the spring plate is avoided, thereby preventing time consuming and costly interruptions in the deburring process.

Figure 8:
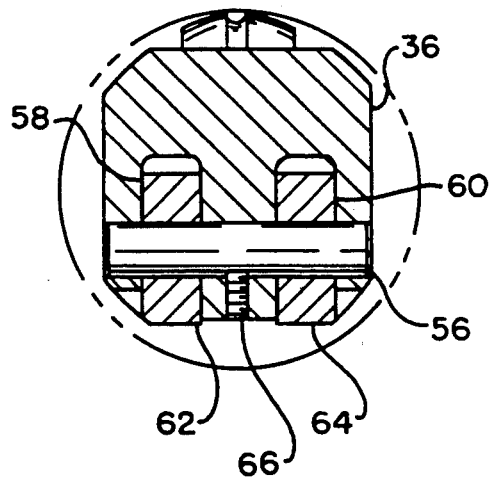
FIG. 8 is a cross-sectional view taken along the plane indicated by the lines 8—8 of FIG. 3.

The pivotal structure of lever arm 48 as shown by FIG. 8 consists of a pivot bar pin 56 extending between grooves 58 and 60 formed in the frame 36 of the device 24 and the arms 62 and 64 of lever 48. Pin 56 is held rigidly to frame 36 by set screw 66. Such double yoke structure provides advantageous strength to such pivotal structure.

Deburring device 24 is provided with a connecting hook 68 which receives a hook 70 (FIG. 3) of a conventional seam weld forming apparatus (not shown) to effect relative movement of the device 24 through the conduit 22.

A particularly significant improvement of our device over that of prior known apparatus of this type is the manner by which ring 10 may be positioned transversely to the axis of conduit 22. In this invention the head 18 is formed with a dovetail connection 72 (FIG. 4) to allow transverse adjustment through rotation of set screw 76 and appropriate tightening of a bolt 78. That is, bolt 78 is rotated counterclockwise to raise head 18 to the desired height and set screw 76 is rotated clockwise to make the head position rigid. Such an arrangement is not in itself new since such a dovetail is shown in the apparatus of U.S. Pat. No 4,710,078. However, the device provides a cover portion 80 (FIG. 1) to head 18 that extends over the top of the dovetail connection. This is important since particles of metal and weld scale typically collect on the top surface of such dovetail connections and penetrate the connection in a manner to render the sliding connection inoperable. The apparatus also provides extending arm or shield portions 82 that extend over the sides of dovetail connection 72 exposing only the bottom of the dovetail to possible contamination.

Figure 7:
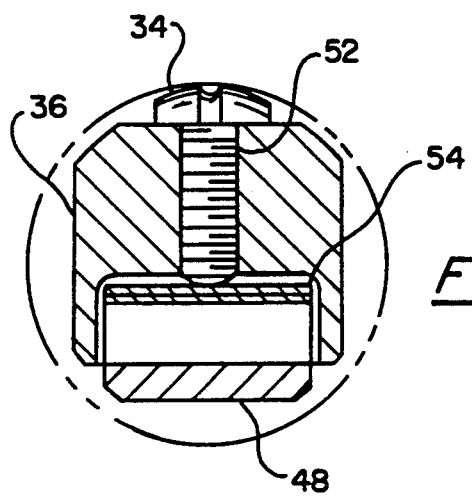
FIG. 7 is a cross-sectional view taken along the plane indicated by the lines 7—7 of FIG. 3.

In another embodiment of our device as shown by FIGS. 10 and 11, hydraulic means are provided to replace the spring members 54 of the embodiment of FIGS. 3 and 7.

Such hydraulic means consists of a controllable source of hydraulic fluid 84 which is in communication with a hydraulic plunger 86 positioned within the frame 88 of the deburring device. The plunger 86 is restrained from horizontal movement by a spring 90 working against the hydraulically sealed cup-shaped cylinder 92. Increased hydraulic pressure from source 84 will cause cup 92 to move forward within the frame 88 of the deburring device of FIGS. 10 and 11 (i.e. to the left as shown) causing the plunger 86 to extend, working against spring 90, and causing a cam surface 94 provided to the end of plunger 86 to bear on a cam follower 96 positioned forwardly on a pivot arm 98 (which corresponds to pivot arm 48 of the embodiment of FIGS. 3 and 4) to force the pivot arm down and roller 100 (corresponds to roller 47 of FIGS. 3 and 4) against the inside of the tube. This arrangement is significant since it allows external control of the pressure applied to the positioned roller to provide a degree of control to the positioning of the cutter ring 10 during the deburring operation.

While certain preferred embodiments of the present invention have been disclosed in detail, it is to be understood that various modifications may be adopted without departing from the spirit of the invention or scope of the following claims.

I claim:

1. A deburring device for deburring the inner longitudinal welding seam on the inner surface of a seam welded conduit formed with an axis, comprising:
   an elongated frame for positioning in a longitudinal moving conduit, said frame having a trailing head,
   a cutting ring mounted on said head, said ring having an axis extending obliquely from the direction of movement of said conduit, means forming a cutting edge on said ring, said edge extending above the surface of said head so as to cut and deburr said seam, wherein the improvement comprises,
   said cutting ring being formed with an interior surface comprising a first frusto-conical section extending from the cutting edge of said ring inwardly to a lesser diameter at an angle in the range of about 40° to about 50° to the face of said ring, said cutting edge being circular and having a first diameter,
   a cylindrical surface merging with said first frusto-conical section at said lesser diameter and extending through said ring,
   said ring being formed with an outer frusto-conical surface extending outwardly from said cutting edge at an angle in the range of about 10° to about 15° to a perpendicular to the face of said ring, said ring being positioned on said head so that the face of said ring forms an angle in the range of about 20° to about 30° to a perpendicular to the axis of said conduit.

2. The deburring device of claim 1 wherein the ring is formed of a length that is less than its diameter.

3. The deburring device of claim 1 wherein the head is formed with an opening of a diameter of at least that of the cutting ring to provide a path for deburring materials to flow into the conduit.

4. The deburring device of claim 1 wherein means are provided for maintaining the position of said device in said conduit which comprise one or more grooved wheels disposed to bear on the inner wall of said conduit bridging said welding seam and one or more bearing wheels disposed to bear on the inner surface of said conduit, including means to apply preselected pressure to urge said grooved wheels against said surface and position said device within said conduit.

5. The deburring device of claim 4 wherein the means for applying pressure to said bearing wheels comprises a lever through which said bearing wheels are pivotally mounted to said frame, a leaf spring being mounted on said frame to urge said lever against said bearing wheels which bear against the inner surface of said conduit, said spring being made of Phosphor Bronz.

6. The device of claim 5 wherein said spring comprises two leaf springs.

7. The deburring device of claim 4 wherein the means for applying pressure to said bearing wheels comprise levers through which said bearing wheels are pivotally mounted to said frame and one or more externally controlled hydraulic plungers are disposed to apply preselected pressure against said levers through a cam surface or cam follower position on said plungers bearing on a cam surface or cam follower positioned on said levers.

8. A cutting ring for mounting on the head of a seam welded deburring device comprising:
a ring-shaped member of greater inner diameter than length, said ring being formed with inner and outer surfaces, said inner surface including a first frusto-conical surface extending from the outermost periphery of said frusto-conical surface inwardly to a lesser diameter at a 45° ($\pm 5°$) angle to the face of said ring, a cylindrical surface of said lesser diameter extending from said frusto-conical surface through said ring, said outer surface extending outwardly from said outermost periphery at a $12\frac{1}{2}°$ ($\pm 2\frac{1}{2}°$) angle to a perpendicular to the face of said ring.

9. The deburring device of claim 1 wherein the trailing head may be adjustably moved relative to said weld seam through a dovetail connection to said elongated frame wherein said head is formed with a cover portion that extends over the top of the dovetail connection.

10. The deburring device of claim 9 wherein said head is provided with extending arm portions that extend over the sides of said dovetail connection.

11. A head for mounting to an elongated frame of a deburring device for positioning in a longitudinal moving seam welded conduit,
said head being provided with means for attachment to the trailing end of said frame, means forming a seat in said head, said seat being shaped to receive a cutting ring,
a cutting ring mounted on said seat, said cutting ring being formed with an interior surface comprising a first frusto-conical section extending from the cutting edge of said ring inwardly to a lesser diameter at an angle of about 45° ($\pm 5°$) to the face of said ring, a cylindrical surface of said lesser diameter extending from said frusto-conical surface through said ring, said ring being formed with an outer surface extending outwardly from said cutting edge at an angle of about $12\frac{1}{2}°$ ($\pm 2\frac{1}{2}°$) to a perpendicular to the face of said ring and said seat being shaped so that the face of said ring forms an angle of about 25° ($\pm 5°$) to a perpendicular to the axis of said conduit.

12. The head of claim 11 including a passageway that opens from the inner cylindrical surface of the ring to a greater diameter.

13. The head of claim 11 wherein the means for connecting the head to the deburring device frame is a dovetail connection that permits lateral positioning of said head of said frame.

* * * * *